J. D. STURGEON.
RAIL JOINT.
APPLICATION FILED JULY 19, 1921.
1,434,456.
Patented Nov. 7, 1922.
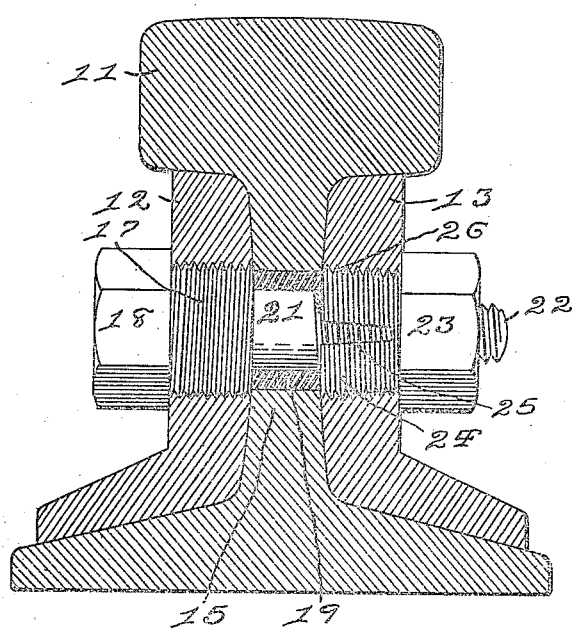
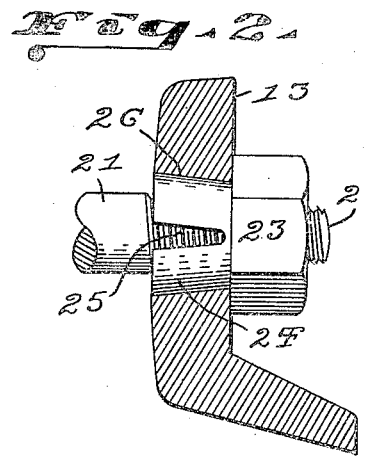
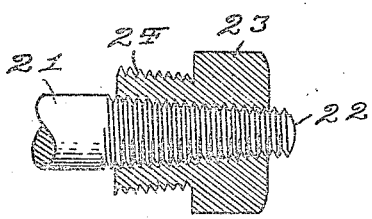
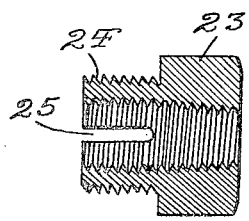
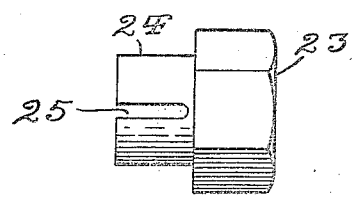
Inventor
Jeremiah Daniel Sturgeon
By Frank P. Shepard.
Attorney Patented Nov. 7, 1922.

1,434,456

UNITED STATES PATENT OFFICE.

JEREMIAH DANIEL STURGEON, OF GUTHRIE, OKLAHOMA.

RAIL JOINT.

Application filed July 19, 1921. Serial No. 485,823.

*To all whom it may concern:*

Be it known that I, JEREMIAH DANIEL STURGEON, a citizen of the United States, and a resident of Guthrie, in the county of Logan and State of Oklahoma, have invented certain Improvements in Rail Joints, of which the following is a specification, reference being had to the accompanying drawings.

The invention pertains to rail joints in which the meeting ends of the rails are connected by fish-plates and bolts, an object being to provide a joint of this class in which the fish-plates can be more tightly and permanently held in clamping engagement with the rails.

Another object is to provide improved means for electrically bonding the rails.

Other objects and advantages of the invention will be set forth in the ensuing description.

Fig. 1 is a vertical cross section of my improved joint.

Figure 2 is a reproduction of a portion of Figure 1, but shows a modification of the nut.

Figure 3 is a reproduction of the view of the bolt and nut shown in Figure 1, but shows the nut in section.

Figure 4 shows the same nut which appears in Figures 1 and 3, but shows said nut before it has been screwed onto the bolt.

Figure 5 shows the nut which appears in Figure 2, but shows said nut before it has been screwed onto the bolt.

Like characters of reference designate like parts in all of them.

The rails, of which only one, 11, is herein shown, abut as is usual and are connected together by fish-plates 12 and 13; bolts 21 being passed through said fish-plates and the webs 15 of the rails and provided with nuts 23 to clamp said parts tightly together.

The joint thus described is well known in the art.

In carrying out the objects stated, each bolt 21 is formed with a cylindrical enlargement 17 immediately adjacent its head 18, and this enlargement is screwthreaded through practically the full thickness of the fish-plate 12.

Where each bolt 21 passes through the web 15 of the rail it is embraced by a sleeve 19 of soft copper or other suitable ductile current-conducting material shown in Fig. 1.

This sleeve 19, in its uncompressed state, slips onto the bolt 21 and into the web 15 freely.

The polygonal nut 23 shown in Fig. 1 has an inward extension 24 of reduced diameter and cylindrical surface which reaches revolubly through practically the full thickness of the fish-plate 13, and when said nut is screwed up on the bolt 21 said extension forces an upsetting movement of the sleeve 19 and causes the latter to closely fill the space between the bolt and web.

The compressed sleeve 19 thus bonds the rails 11 to the bolts 21, and the latter are in turn bonded to the fish-plate 12 by their screwthreaded engagement therewith, thus affording sufficient electrical connection of the rails for electric railway purposes.

The bolt 21 has its screw-threaded end 22 tapered, as seen in Figure 3.

The nut 23 used on the tapered bolt 21 shown in Figure 1 has its inward extension 24 slit as at 25, so as to be spread into conical form as it is screwed onto said bolt and tightly fill the inwardly-diverging hole 26 in the fish-plate 13.

In Figure 1 the extension 24 of the nut 23 is shown screwthreaded through the fish-plate 13, and this screwthreaded engagement together with the resultant friction and divergent spread of said extension keeps the nut from unscrewing from said fish-plate.

The engagement of the nut 23 with the bolt 21, and the engagement of the extension 24 of said nut with the fish-plate 13, are both by right-hand threads, while the engagement of the enlargement 17 of the bolt 21 with the fish-plate 12 is by left-hand threads; and it will thus be seen that any unscrewing movement of the bolt with respect to the fish-plate 12 will only screw the bolt more tightly into the nut 23.

It is possibly preferable that the screwthreaded engagement of the nut 23 with the bolt 21 be by coarser threads than the threads between the extension 24 and fish-plate 13, so that in screwing the nut 23 into place it will draw the bolt tight and clamp the two fish-plates 12 and 13 to the web 15.

Figures 2 and 5 show the nut 23 with its extension 24 unthreaded, and when this extension is spread by screwing the nut onto the bolt 21 it keeps the nut from leaving the fish-plate 13 and from entirely losing off the bolt.

Having thus described the invention, I claim:—

1. A bolt having a head and having adjacent said head a screwthreaded enlargement, and a nut screwthreaded to the opposite end of the bolt, the nut-receiving end of the bolt being tapered, the nut being adapted to be spread when screwed onto the tapered bolt.

2. In combination with a structure to be held together by a bolt, a bolt passing through said structure, said bolt having a head and having adjacent said head a portion screwthreaded to the structure, the end of the bolt opposite the head being tapered and screwthreaded, a nut screwthreaded to the tapered end of the bolt and having a slit extension adapted to be spread by the bolt, the portion of the structure adjacent the nut being adapted to receive the extension and being inwardly divergent to allow the spread of said extension.

3. In combination with a rail-way rail and fish-plates disposed on opposite sides of said rail, a bolt passing through said fish-plates and the rail, said bolt having a head and having adjacent said head a portion screwthreaded to the adjacent fish-plate, the end of the bolt opposite the head being tapered and screwthreaded, a nut screwthreaded to the tapered end of the bolt and having an exteriorly screwthreaded extension passing through the opposite fish-plate, the extension being adapted to be spread as the nut is screwed onto the bolt, said opposite fish-plate being screwthreaded to engage the extension of the nut and being inwardly divergent to allow spread of said extension.

Witness my hand this 22nd day of June, 1921.

JEREMIAH DANIEL STURGEON.